(12) United States Patent
Fink, Jr.

(10) Patent No.: US 7,578,872 B2
(45) Date of Patent: Aug. 25, 2009

(54) VAPOR TRAPPING CANISTER VAPOR PRESSURE MANAGEMENT SYSTEM

(75) Inventor: Arthur C. Fink, Jr., Lonedell, MO (US)

(73) Assignee: Husky Corporation, Pacific, MO (US)

( * ) Notice: Subject to any disclaimer, the term of this patent is extended or adjusted under 35 U.S.C. 154(b) by 407 days.

(21) Appl. No.: 11/500,211

(22) Filed: Aug. 7, 2006

(65) Prior Publication Data
US 2007/0266851 A1    Nov. 22, 2007

Related U.S. Application Data

(60) Provisional application No. 60/797,599, filed on May 4, 2006, provisional application No. 60/539,848, filed on Jan. 28, 2004.

(51) Int. Cl.
*B01D 53/02* (2006.01)
(52) U.S. Cl. .............................. 96/143; 95/141; 95/144; 95/148; 96/113; 96/116
(58) Field of Classification Search .................... 96/143, 96/144, 116, 113; 95/146, 148, 141, 143–144
See application file for complete search history.

(56) References Cited

U.S. PATENT DOCUMENTS

| | | | |
|---|---|---|---|
| 4,462,811 A * | 7/1984 | Dinsmore et al. ............. 95/26 |
| 5,154,735 A | 10/1992 | Dinsmore et al. | |
| 5,305,807 A | 4/1994 | Healy | |
| 5,345,771 A | 9/1994 | Dinsmore | |
| 5,529,614 A | 6/1996 | Engler et al. | |
| 5,951,741 A | 9/1999 | Dahl et al. | |
| 6,486,375 B1 | 11/2002 | Lenhart et al. | |
| 6,736,871 B1 | 5/2004 | Green et al. | |
| 2004/0000338 A1 * | 1/2004 | Heiderman ................. 137/494 |

FOREIGN PATENT DOCUMENTS

| AU | 630012 | 3/1991 |
|---|---|---|
| CA | 2021702 | 3/1990 |

* cited by examiner

*Primary Examiner*—Duane Smith
*Assistant Examiner*—Karla Hawkins
(74) *Attorney, Agent, or Firm*—Paul M. Denk

(57) ABSTRACT

An underground fuel tank releases vapors depending upon air pressure. A vapor pressure management system has a canister for a vapor recovery system that connects with piping from an underground tank and has carbon therein along with appurtenant pipes and valves. When an ORVR vehicle refuels, the pressure lowers in an underground tank that draws air through the valves into the canister. After refueling an ORVR vehicle, environmental conditions generate hydrocarbon vapors. Barometric pressure drops and evaporated fuel during long refueling lulls produce hydrocarbon vapors at an increased pressure. Those hydrocarbon rich vapors then return to the canister of the system where the carbon binds the hydrocarbons while releasing air to the atmosphere. The refueling of the next ORVR vehicle draws in atmospheric air to purge the hydrocarbons retained in the canister of the system.

8 Claims, 3 Drawing Sheets

VAPOR TRAPPING CANISTER VAPOR PRESSURE MANAGEMENT SYSTEM

CROSS REFERENCE TO RELATED APPLICATION

This non-provisional patent application claims priority to the provisional patent application having Ser. No. 60/797,599, which was filed on May 4, 2006. Also, this non-provisional patent application is related to the non-provisional patent application having Ser. No. 11/043,526, which was filed on Jan. 26, 2005, (now U.S. Pat. No. 7,011,119), which claims priority to the provisional application having Ser. No. 60/539,848, which was filed on Jan. 28, 2004

BACKGROUND OF THE INVENTION

The vapor trapping canister vapor pressure management system relates to underground fuel storage tank vapor recovery, in general, and more specifically, to the capture and purging of hydrocarbon vapors as released from an underground storage tank during fueling by ORVR vehicles. A unique aspect of the present invention is retention of hydrocarbons in the vapor pressure management canister while allowing inflow and outflow of other gases to regenerate the carbon in the canister.

Fuel storage tanks, such as underground storage tanks, UST, used to store gasoline at gas stations, are subject to variable pressures that affect the ability of the fueling system and vapor recovery system to operate correctly. The fuel storage tanks thus have vents which release the excess pressure when the tank exceeds a certain predetermined maximum pressure. Excess pressure can be caused by vacuum assisted refueling as when more vapors are drawn into the tank than volume of fuel dispensed, by not connecting the vapor return hose to the transfer tank when refueling the tank, or by local atmospheric conditions, particularly barometric pressure changes associated with weather fronts. Additionally, negative pressure or partial vacuums can appear in the storage tank by dispensing more fuel than vapors that are drawn into the tank as during vacuum assist, or balance system, refueling. In that situation, the tank requires additional pressure or more likely the vacuum must be dissipated.

Since the 1998 automotive model year, onboard refueling vapor recovery, ORVR, technology has been employed initially on passenger cars and presently on light trucks. As is well known, the motorist refuels his/her vehicle at a service station. The fuel is pumped from an underground tank, by the dispenser, through a hose and nozzle, for filling the vehicle fuel tank. Normally, the vapors generated within the fuel tank, through refueling, are returned through the vapor path of the fuel hose, back to the dispenser, either by the balanced pressure method—called Stage II vapor recovery—or by a pump, and then are returned to the underground storage tank for containment.

Escaped gasoline vapors raise pollution concerns and trigger governmental regulations. Hydrocarbon vapors, such as octane, under the action of sunlight form ground level ozone. Such ozone affects the respiratory tract in humans. Normally, balance type Stage II vapor recovery stations operate at a negative pressure except during closure of the station. When an ORVR equipped vehicle is refueled, the ORVR system retains the vapors from the vehicle fuel tank, and does not return the vapors to the dispensing system, often lowering the pressure within the fuel storage tank. An ORVR vehicle refueling at a Stage II equipped station imposes a negative pressure on the Stage II system that draws atmospheric air into an underground fuel tank. The atmospheric air then absorbs hydrocarbons from stored fuel and with each ORVR vehicle that refuels, the pressure in the underground tank increases. When that pressure exceeds a limit, valves release the air containing hydrocarbons from the tank to the atmosphere thus, contributing to pollution when attempting not to do so.

Generally, various methods capture gasoline vapors and then return them to the underground tank. In doing so, the vapor recovery systems prevent vapors from escaping to the atmosphere as components of pollution. Vapor recovery systems are of two types. First, the vacuum assist system utilizes the partial vacuum created within the nozzle, by means of the flowing fuel passing through the nozzle during its dispensing, or a vacuum pump, and this partial vacuum tends to attract vapors back into the nozzle, either through a bellows arrangement used in conjunction with the nozzle spout, or through a passage created between concentrically arranged nozzle spouts, that allows the partial vacuum to attract the vapors back into the spout for return to the underground storage tank. Second, the balanced pressure system begins upon pumping gasoline in an automobile fuel tank, then displaced air is forced back towards the emplaced nozzle and that forces the gasoline vapors to be captured for return back into the fuel line, and eventually back to the underground storage tank.

Prior art designs defeat pressurization and vapor absorption in the underground fuel tank by two classes of devices. First, nozzles and other parts of the dispensing system are regulated by an ORVR detecting sensor. The sensor recognizes the pressure dip caused by an ORVR vehicle and promptly reduces air ingestion to less than the volume of fuel dispensed. The sensor and nozzles result in a slight negative pressure in the underground tank that limits vapor loss to the atmosphere. Second, membranes and condensing processes control the vapor at the source, in the underground fuel tank. The membranes and condensing processes cool or otherwise liquefy gasoline vapors and return them to the underground tank while letting cleansed air return to the atmosphere. Though collecting vapors, the prior art required additional mechanical equipment, and has higher installation and operational costs, and energy consumption.

The patent to Healy, U.S. Pat. No. 5,305,807, describes a vapor recover device. This device has a vacuum pump connected to underground storage tanks coupled with a solenoid. A pressure switch monitors pressure in the UST and energizes the solenoid to move valves within three conditions to direct air flow into or out of the UST. The valves control flow of hydrocarbons and air through a conduit system. This patent discloses a pump and solenoid not in the present invention.

The present art overcomes the limitations of the prior art. That is, the present invention, a vapor trapping canister vapor pressure management system, provides containment and purging of hydrocarbons in fuel vapors while allowing passage of air through the canister of the system. The canister system uses pressure differences created in the underground tank by ORVR vehicles to move hydrocarbons into the canister and air out of the canister without active electrical or chemical means. In other words, no pumps are required.

Thus, prior art devices do not provide for purging hydrocarbons in a container and preventing their return into an underground fuel tank while allowing air to pass freely through the container. The present invention uses the weakness of the interaction between an ORVR vehicle and a stage 11 dispensing system to collect and purge hydrocarbon vapors while returning air alone to the atmosphere.

SUMMARY OF THE INVENTION

A vapor trapping canister vapor pressure management system connects and communicates with piping from an underground tank. The present invention includes a canister, carbon within the canister, and valves and piping in communication with the atmosphere. When an ORVR vehicle refuels, the pressure lowers in an underground tank that draws air through the valves into the canister. After refueling an ORVR vehicle, the underground tank remains subject to environmental conditions that generate hydrocarbon vapors, such as octane $C_8H_{18}$. Barometric pressure drops and evaporated fuel during long refueling lulls produce hydrocarbon vapors at an increased pressure. Those hydrocarbon rich vapors then return to the canister where the carbon binds the hydrocarbons while releasing air to the atmosphere. The refueling of the next ORVR vehicle draws in atmospheric air to purge the hydrocarbons retained in the canister. This cycle of hydrocarbon vapor binding and purging, regenerative carbon adsorption, continues with each ORVR vehicle.

Therefore, it is an object of the invention to provide a vapor trapping canister vapor pressure management system capable of removing hydrocarbons from vapors removed from an underground fuel tank.

It is another object of the invention to collect hydrocarbon laden vapors by pressure increases within an underground fuel tank.

It is another object of the invention to collect atmospheric air into the canister by pressure decreases within an underground fuel tank when ORVR vehicles refuel.

It is another object of the invention to purge collected hydrocarbons by collected atmospheric air as the atmospheric air is discharged back into the atmosphere.

It is another object of the invention to operate independent of electrical or mechanical power.

It is another object of the invention to permit ready inspection and changing of the carbon placed within the canister.

It is another object of the invention to encourage prompt and accurate manual and automatic adjustment in response to pressure fluctuations and repairs.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

In referring to the drawings.

The same reference numerals refer to the same parts throughout the various figures.

DESCRIPTION OF THE PREFERRED EMBODIMENT

The present art overcomes the prior art limitations by providing a carbon canister and appurtenant valves and controls to cleanse hydrocarbon vapors from air released from an underground storage tank "UST" during ORVR refueling. At service stations, ORVR equipped vehicles refuel, often inducing negative pressure upon an UST that draws in atmospheric air which blends with hydrocarbons in the UST. When the UST reaches a high enough pressure, relief valves open and vent the hydrocarbon laden air from the UST to the atmosphere.

Figure 1:
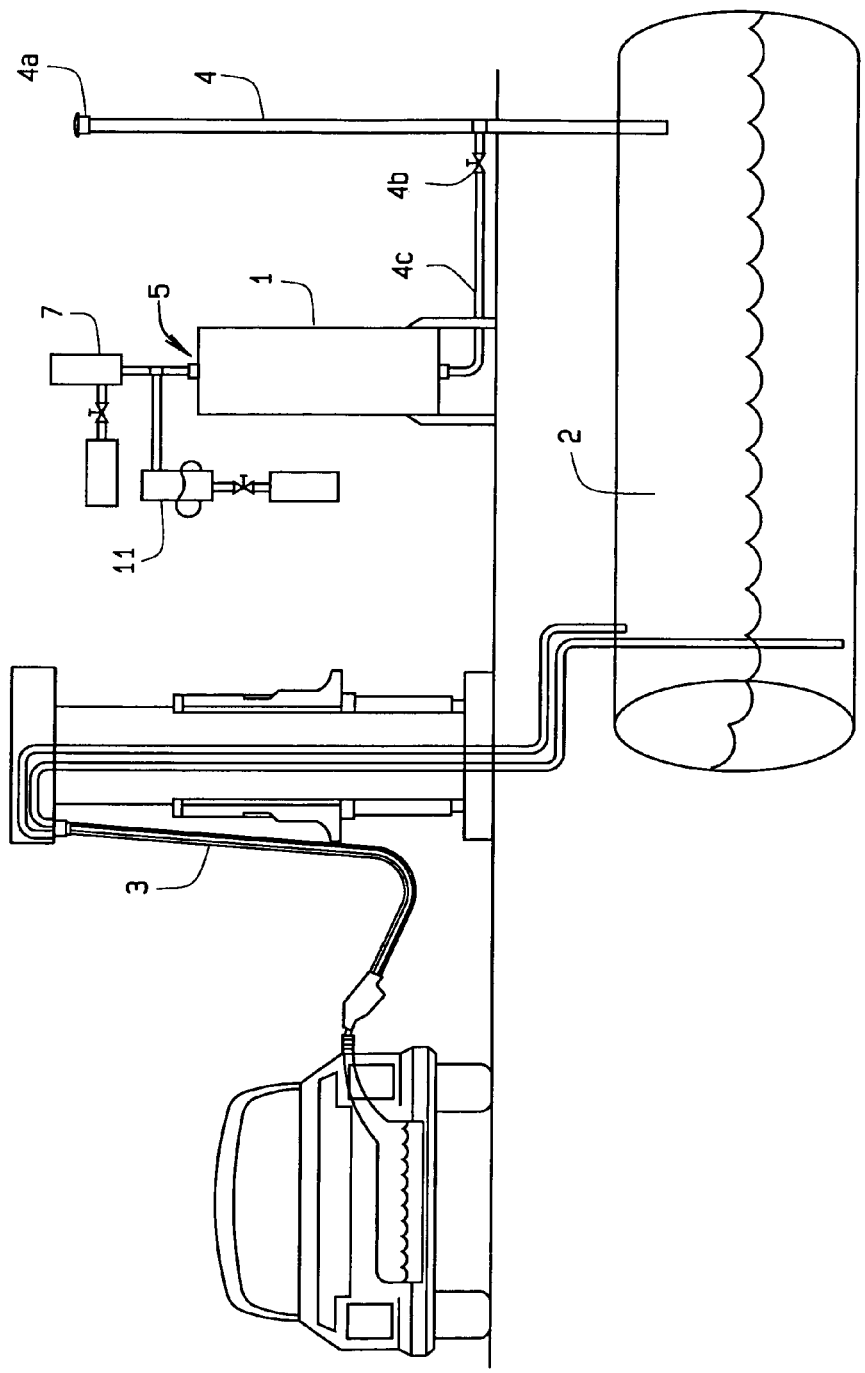
FIG. 1 illustrates a gasoline station where a vehicle refuels from an underground tank connected to the preferred embodiment of the canister for a vapor recovery system constructed in accordance with the principles of the present invention.

In referring to FIG. 1, the preferred embodiment of the canister 1 of the vapor pressure management system for vapor recovery is shown connected to an UST 2 in a refueling system 3. The UST has a vent stack 4 with an inlet generally above the maximum fill line of the UST and here shown opposite the vapor recovery. The vent stack then communicates to the canister 1 and retains an emergency pressure relief valve 4a. A shutoff valve 4b of the ball type is in the line from the vent stack to the canister. The line then connects to the canister. Opposite the line from the UST, the canister has a canister inlet 5. The inlet has regulated communication with the atmosphere. The inlet receives atmospheric air under certain conditions or discharges air from the line under other conditions.

Figure 2:
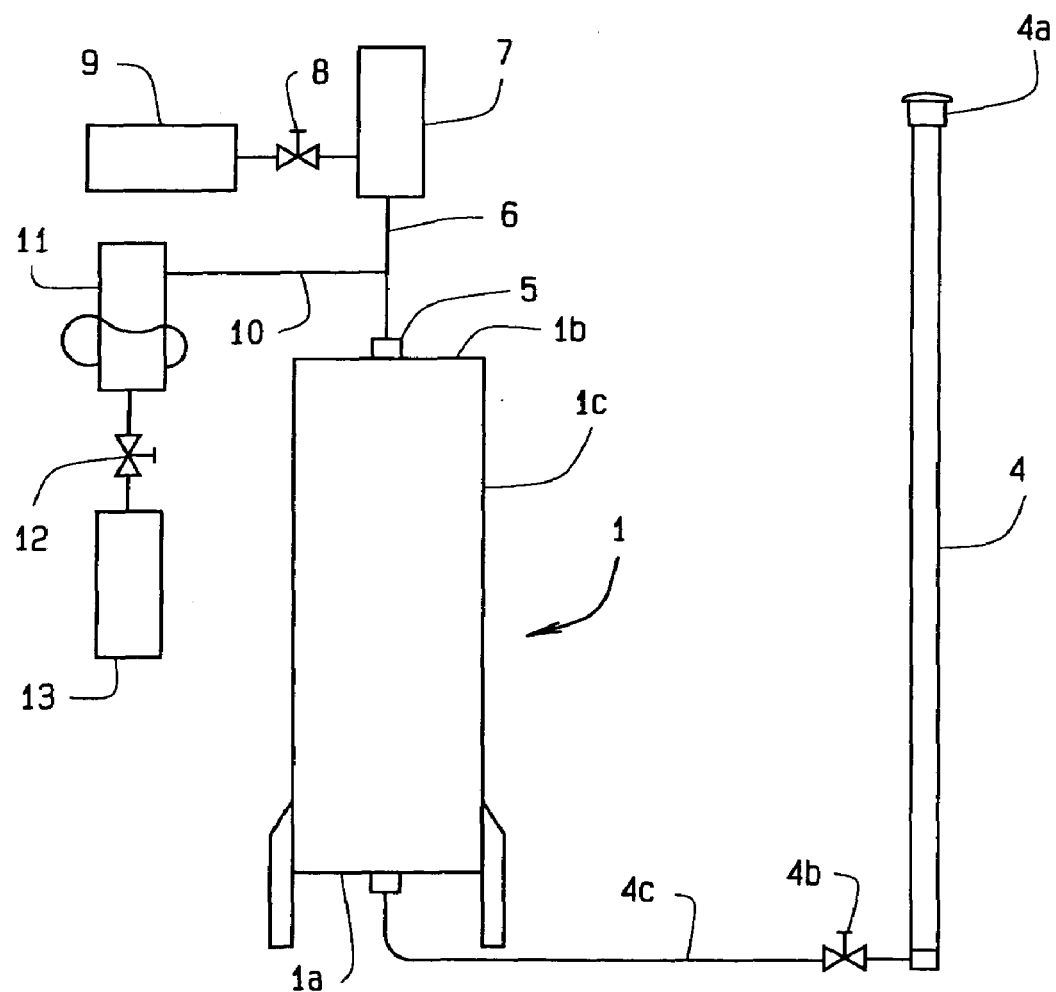
FIG. 2 shows a detailed view of the canister of the present invention, and appurtenant valves and control mechanisms; and, FIG. 3 describes a detailed view of the canister in an alternate embodiment of the present invention.

FIG. 2 shows the present invention in more detail. The canister 1 has a generally cylindrical shape, here shown upright. The canister has a bottom 1a and an opposite top 1b. The bottom and the top have openings to permit communication to the UST line 4c and the inlet 5 respectively. Though a cylindrical shape is described, alternative shapes of the canister, rectangular, round, spherical, conic and the like are anticipated. The canister has a wall 1c that connects with the perimeters of the top and the bottom to seal the canister. The canister contains activated charcoal and other carbon materials in dry form, generally filling the canister. Alternatively, the canister contains activated charcoal in an aqueous solution.

The inlet then proceeds to its first branch control 6. The first branch control communicates to the atmosphere for drawing in air through the canister to the UST. The first branch control has a vacuum regulator 7 in communication with a valve 8 that connects with a screened intake 9. The intake 9 admits atmospheric air into the canister generally at a low pressure and when the vacuum regulator 7 opens.

The inlet 5 has a second branch control 10. The second branch control releases treated air from the canister to the atmosphere. The second branch control has a pressure regulator 11 in communication with a valve 12 that then connects with a screened exhaust or outlet 13. The outlet 13 is hereby shown below the intake 9 however, other locations of them are anticipated. Such locations are recommended to be separated to prevent recirculation of hydrocarbon vapors.

To utilize the present invention, an operator connects the UST line 4c to the bottom 1a of the canister 1. Then the inlet 5 is connected to the top 1b and the first branch control 6 and the second branch control 10 are connected to the inlet 5. In operation, the present invention stands in communication with the UST. After a few refuelings, the pressure drops in the UST and in the line 4c and thus in the canister 1. The vacuum regulator 7 detects the pressure drop and opens to admit air from the intake 9 into canister 1 and then into the line 4c. The air passing through the carbon of the canister strips any hydrocarbons therein and returns them to the UST. Once the pressure stabilizes in the UST, the vacuum regulator closes, stopping the inflow of air into the canister.

After additional refuelings, barometric pressure changes, and like events, the UST accumulates hydrocarbons under higher pressure. The higher pressure affects the canister of the vapor pressure management system and the pressure regulator 11 opens at a certain pressure. The open second branch control 10 draws hydrocarbon laden air from the UST through the canister. The carbon in the canister strips the hydrocarbons from the UST air and retains them upon the carbon. The cleansed air is then released from the outlet 13. Once the pressure again stabilizes in the UST, the pressure regulator closes the second branch control.

If the canister of the system clogs or otherwise fails and the UST pressure increases severely, the vent 4 has a pressure relief valve 4a that opens. Opening of this valve is anticipated on the order of a handful of hours per year. The cycle of purging and retaining hydrocarbons then repeats until the carbon is exhausted. The carbon exhausts after some years and requires replacement. The present invention permits ready replacement of the activated carbon, or other form of carbon within the canister. In operation, the present invention maximizes the air introduced into the UST and minimizes any hydrocarbons released from the UST.

Figure 3:
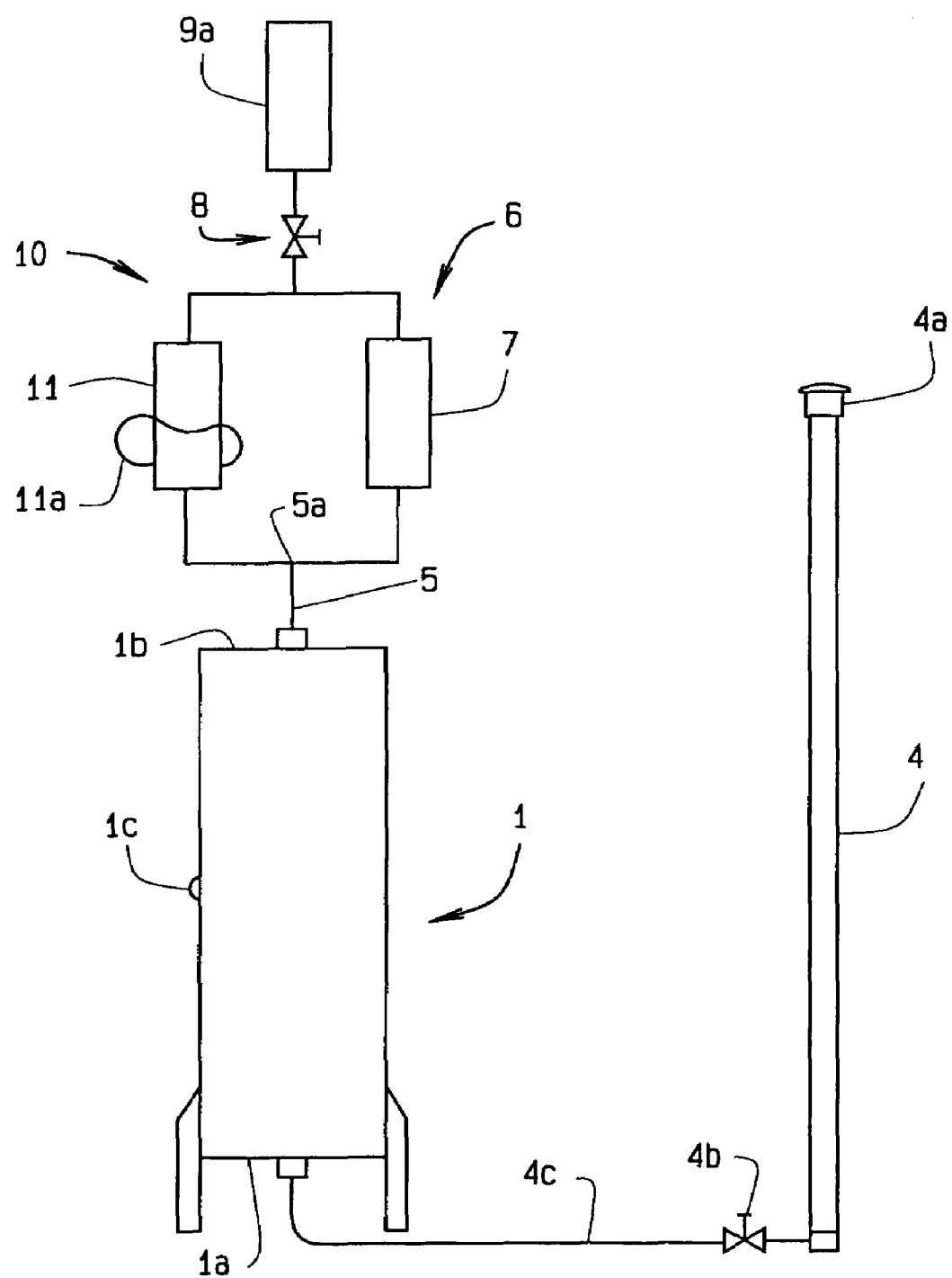

FIG. 3 shows an alternate embodiment of the present invention with both branch controls communicating to the atmosphere through the same intake. As before, the canister 1 has a generally cylindrical shape, here shown upright, with a bottom 1a and an opposite top 1b. The bottom and the top have openings to permit communication to the UST line 4c and the inlet 5 respectively. The canister has a wall 1c that connects with the perimeters of the top and the bottom to seal the canister. The canister contains activated charcoal and other carbon materials in dry form, generally filling the canister. Alternatively, the canister contains activated charcoal suspended within an aqueous solution.

The inlet then proceeds to a tee 5a that joins both branch controls. The first branch control communicates to the atmosphere for drawing air through the intake 9a, into the canister, and onwards to the UST. The first branch control has a vacuum regulator 7 in communication with a valve 8 that connects with a screened intake 9a. The intake 9a admits atmospheric air into the canister generally at a low pressure and when the vacuum regulator 7 opens.

From the tee 5a in the opposite direction, the inlet 5 has a second branch control 10. The second branch control releases treated air from the canister to the atmosphere. The second branch control has a pressure regulator 11 in communication with the valve 8 that then connects with the screened intake 9a. A line of tubing 11a surrounds the regulator to disperse static electricity from the sensitive regulator. The screened intake 9a in the alternate embodiment both admits air into the canister and releases gases from the canister. Though the screened intake serves dual functions, the opposing functions of the vacuum regulator 10 and the pressure regulator 11 prevent recirculation of hydrocarbon vapors.

Similar to before, an operator connects the UST line 4c to the bottom 1a of the canister 1 to operate the invention. Then the inlet 5 is connected to the top 1b and the first branch control 6 and the second branch control 10 are connected to the inlet 5 through the tee 5a. In operations, the present invention communicates with the UST. After a few refuelings, the pressure drops in the UST and in the line 4c and thus in the canister 1. The vacuum regulator 7 detects the pressure drop and opens to admit air from the intake 9a, through the valve 8, and into canister 1 and then into the line 4c. The air passing through the charcoal carbon of the canister strips any hydrocarbons therein and returns them to the UST. Once the pressure stabilizes in the UST, the vacuum regulator closes, stopping the inflow of air into the canister.

After additional refuelings, barometric pressure changes, and like events, the UST accumulates hydrocarbons under higher pressure. The higher pressure affects the canister of the vapor pressure management system and the pressure regulator 11 opens at a certain pressure. The open second branch control 10 draws hydrocarbon laden air from the UST through the canister. The charcoal carbon in the canister strips the hydrocarbons from the UST air and retains them upon the charcoal carbon. The cleansed air is then released from the outlet 13. Once the pressure again stabilizes in the UST, the pressure regulator closes the second branch control.

If the canister of the system clogs or otherwise fails and the UST pressure increases severely, the vent 4 has a pressure relief valve 4a that opens. Opening of this valve is anticipated on the order of a handful of hours per year. The cycle of purging and retaining hydrocarbons then repeats until the charcoal carbon is exhausted. The charcoal carbon exhausts after some years and requires replacement. The present invention permits ready replacement of the charcoal, activated carbon, or other carbon within the canister. In operation, the present invention maximizes the air introduced into the UST and minimizes any hydrocarbons released from the UST.

From the aforementioned description, a vapor trapping canister vapor pressure management system has been described. The canister of the vapor pressure management system is uniquely capable of containing hydrocarbon vapors and returning them to a UST instead of releasing them to the atmosphere. The canister and the system and its various components may be manufactured from many materials including but not limited to polymers, high density polyethylene HDPE, polypropylene PP, polyethylene terephalate ethylene PETE, polyvinyl chloride PVC, polystyrene PS, nylon, steel, charcoal, activated charcoal, activated carbon, ferrous and non-ferrous metals, their alloys, and composites.

I claim:

1. A device for cleansing hydrocarbon vapors comprising:
   a canister containing carbon therein, having a bottom and an opposite top, an inlet in said top and an outlet;
   said bottom receiving hydrocarbon vapors from a hydrocarbon source and releasing air into the hydrocarbon source;
   said inlet having a first branch control drawing air into said canister when the hydrocarbon source is at low pressure and, a second branch control releasing air from said canister when the hydrocarbon source is at high pressure wherein air flows through either said first branch control or said second branch control;
   said first branch control having a vacuum regulator in communication with a valve and with an intake screen, said vacuum regulator opening to admit air into said canister when a low pressure within the hydrocarbon source is detected; and,
   said second branch control having a pressure regulator in communication with a valve and with an outlet, said pressure regulator opening to release air cleansed of hydrocarbon vapors when a high pressure within the hydrocarbon source is detected:
   whereby the inflow of air into said canister purges the carbon of hydrocarbons and the outflow of air from said canister draws vapors from the hydrocarbon source through said canister for adsorption by the carbon;
   whereby the repetitive inflow and outflow of air through said canister regenerates the carbon.

2. The hydrocarbon vapor cleansing device of claim 1 further comprising:

said bottom including a line connecting to said canister then to a valve which communicates to a vent stack, said vent stack in communication with the hydrocarbon source and including a pressure relief valve above said line, and said pressure relief valve opening less than five times annually.

3. A device to remove hydrocarbon vapors from air discharged from a hydrocarbon source under ambient pressure conditions, comprising:

a canister containing a substance adapted to remove hydrocarbon vapors from air wherein the inflow of air into said canister purges said substance of hydrocarbons and the outflow of air from said canister draws vapors from the hydrocarbon source through said canister for adsorption by said substance, thereby the repetitive inflow and outflow of air through said canister regenerates said substance;

said canister having a bottom and an opposite top, an inlet in said top, and an outlet;

said outlet receiving hydrocarbon vapors from a hydrocarbon source and releasing air into the hydrocarbon source;

a first branch control upon said inlet and drawing air into said canister when the hydrocarbon source is at low pressure; and, a second branch control upon said inlet releasing air from said canister when the hydrocarbon source is at high pressure;

wherein air flows through either said first branch control or said second branch control.

4. The hydrocarbon removing device of claim 3 further comprising:

a vacuum regulator communicating with a valve and with an intake screen, and opening to admit air into said canister upon detection of a low pressure within the hydrocarbon source and locating upon said first branch control; and, a pressure regulator communicating with a valve and with an outlet, and opening to release air cleansed of hydrocarbon vapors upon detection of a high pressure within the hydrocarbon source and locating upon said second branch control.

5. The hydrocarbon removing device of claim 3 further comprising:

a line connecting to said bottom and then communicating to a vent stack, said vent stack communicating with the hydrocarbon source and including a pressure relief valve above said line, and said pressure relief valve opening less than five times annually.

6. The hydrocarbon removing device of claim 3 wherein said substance is selected from one of carbon, activated carbon, charcoal, or activated charcoal.

7. A device to remove hydrocarbon vapors from air discharged from a hydrocarbon source under ambient pressure conditions, comprising:

a canister having a bottom and an opposite top, and an inlet in said top, said bottom receiving hydrocarbon vapors from a hydrocarbon source and releasing air into the hydrocarbon source, a first branch control upon said inlet and drawing air into said canister when the hydrocarbon source is at low pressure; and a second branch control upon said inlet releasing air from said canister when the hydrocarbon source is at high pressure wherein air flows through either said first branch control or said second branch control;

a vacuum regulator upon said first branch control a pressure regulator upon said second branch control;

a line communicating from said canister to a vent stack including a pressure relief valve, and said pressure relief valve opening less than five times annually; and, said canister containing a substance adapted to remove hydrocarbon vapors from air wherein the inflow of air into said canister purges said substance of hydrocarbons and the outflow of air from said canister draws vapors from the hydrocarbon source through said canister for adsorption by said substance, thereby the repetitive inflow and outflow of air through said canister regenerates said substance.

8. The hydrocarbon removing device of claim 7 wherein said substance is selected from one of carbon, activated carbon, charcoal, and activated charcoal.

* * * * *